United States Patent
Brady et al.

(10) Patent No.: US 11,023,162 B2
(45) Date of Patent: Jun. 1, 2021

(54) CACHE MEMORY WITH TRANSIENT STORAGE FOR CACHE LINES

(71) Applicant: Apple Inc., Cupertino, CA (US)

(72) Inventors: Jeffrey T. Brady, Orlando, FL (US); Sindhuja Sethuraman, Orlando, FL (US); Frank W. Liljeros, Sanford, FL (US); Adil M. Sadik, Orlando, FL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/548,784

(22) Filed: Aug. 22, 2019

(65) Prior Publication Data

US 2021/0055883 A1    Feb. 25, 2021

(51) Int. Cl.
  *G06F 12/0871*  (2016.01)
  *G06F 3/06*  (2006.01)
(52) U.S. Cl.
  CPC .......... *G06F 3/0658* (2013.01); *G06F 3/0604* (2013.01); *G06F 3/0673* (2013.01); *G06F 12/0871* (2013.01)
(58) Field of Classification Search
  CPC .................................................. G06F 12/0871
  See application file for complete search history.

(56) References Cited

U.S. PATENT DOCUMENTS

| 7,461,209 B2 | 12/2008 | Altman et al. |
| 8,051,248 B2 | 11/2011 | Frank et al. |
| 2009/0006767 A1* | 1/2009 | Saha ........................ G06F 9/522 711/145 |
| 2014/0173216 A1* | 6/2014 | Jayasena ............ G06F 12/0891 711/135 |
| 2015/0293847 A1 | 10/2015 | Patsilaras et al. |

* cited by examiner

*Primary Examiner* — Edwards J Dudek, Jr.
(74) *Attorney, Agent, or Firm* — Kowert, Hood, Munyon, Rankin & Goetzel, P.C.

(57) ABSTRACT

Techniques are disclosed relating to caches that support transient storage fields for cache entries. In some embodiments, cache circuitry includes a set of multiple cache entries that each include a tag field and a data field. In some embodiments, transient storage circuitry includes a transient storage field for each of the multiple cache entries. In some embodiments, cache control circuitry stores received first data in the data field of a cache entry and stores received transient data in a corresponding transient storage field. In response to an eviction determination for the cache entry, however, the cache control circuitry may write the first data but not the transient data to a backing memory for the cache circuitry. In various embodiments, disclosed techniques may allow caching additional data that is transient without increasing bandwidth to the backing memory.

21 Claims, 7 Drawing Sheets

Store received first data in a data field of a cache entry and store received transient data in a corresponding transient storage field, where the cache includes a set of multiple cache entries that each include a tag field and a data field and where transient storage circuitry includes a transient storage field for each of the multiple cache entries
510

In response to an eviction determination for the cache entry, write the first data but not the transient data to a backing memory for the cache circuitry
520

FIG. 5

CACHE MEMORY WITH TRANSIENT STORAGE FOR CACHE LINES

BACKGROUND

Technical Field

This disclosure relates generally to cache memory and more particularly to transient storage for cache lines.

Description of the Related Art

Typically, processors use cache memory to store data or instructions, e.g., for quicker access, relative to accesses to a backing memory. Thus, processors often use a cache to store information that is likely to be used repeatedly and caches are typically smaller than backing memory space (e.g., a larger cache or a system memory). When a cache is full and a write occurs that does not hit the cache, a cache line may be selected for eviction to make room for the incoming write data. Lines may be selected for eviction based on a replacement policy such as selecting the least-recently-used (LRU) entry. Typically, evicted cache lines are written to the backing memory so that their data is not lost (although the timing of writing data to backing memory may vary, e.g., in write-through or write-back implementations). Traditionally, increasing the amount of cached data increases bandwidth to the backing memory for the cache.

BRIEF DESCRIPTION OF THE DRAWINGS

FIG. 5 is a flow diagram illustrating an example method for using transient cache storage, according to some embodiments.

Figure 1:
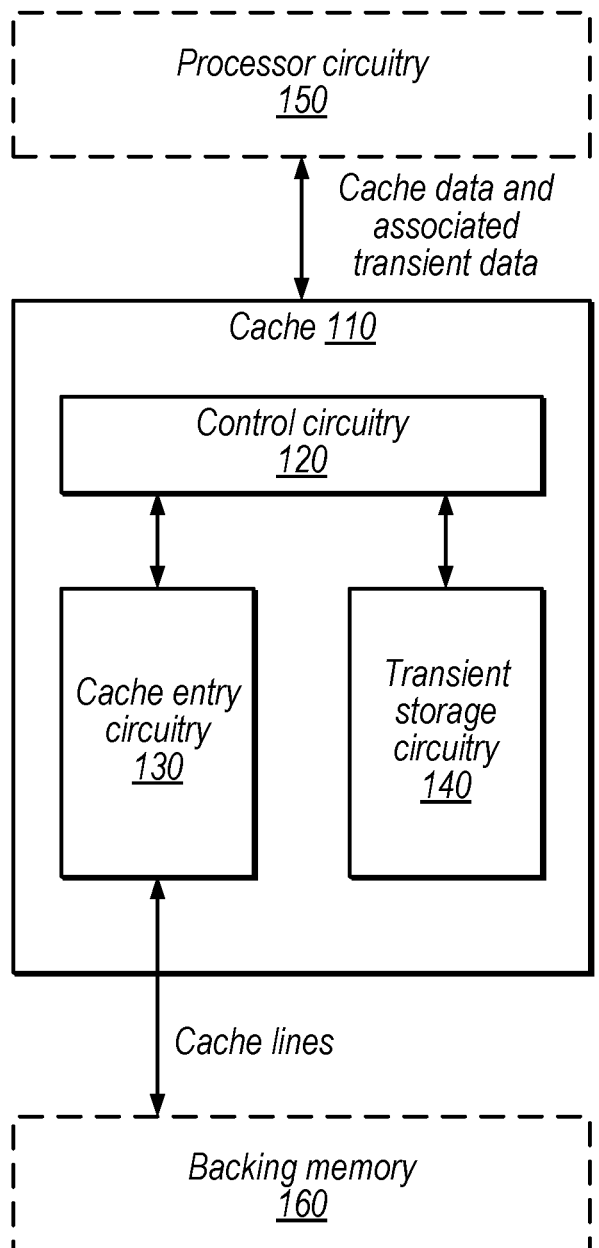
FIG. 1 is a block diagram illustrating an example cache with transient storage circuitry, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "cache configured to store data" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

In some embodiments, a cache is configured to store transient data that may be accessed multiple times while cached, similar to traditional cached data. When transient data is evicted, however, the cache circuitry does not write transient data to a backing memory (e.g., another element in a cache/memory hierarchy). Therefore, once transient data leaves the cache, it may need to be re-generated if used again because it cannot be retrieved from the backing memory.

In various embodiments discussed in detail below, cache entries have corresponding transient storage entries (e.g., with a one to one mapping between cache entries and transient storage entries). The disclosed techniques may reduce bandwidth within a cache/memory hierarchy, reduce memory footprint in such a hierarchy, or reduce power consumption, relative to implementations in which transient data is stored in a backing memory like other data.

In some embodiments, the transient storage is implemented using separate hardware from the cache entries, such as a random access memory (RAM). In some embodiments, transient storage is implemented for a first-level cache while in other embodiments transient storage may be implemented at other cache levels or at multiple cache levels.

FIG. 1 is a block diagram illustrating an example cache system that includes transient storage circuitry, according to some embodiments. In the illustrated embodiment, a device includes cache 110, processor circuitry 150, and backing memory 160. These elements may be included on the same device or integrated circuit as the cache 110 or may be separate, as indicated by the dashed lines in FIG. 1. In the illustrated embodiment, although processor circuitry 150 and cache 110 communicate both cache lines and associated transient data, the system uses backing memory 160 for the cache line data in circuitry 130 and not the transient data in circuitry 140.

Cache 110, in the illustrated embodiment, includes control circuitry 120, cache entry circuitry 130, and transient storage circuitry 140. Control circuitry 120 may determine cache hits and misses, allocate entries, invalidate cache entries, evict cache entries, etc. In some embodiments, control circuitry 120 stores cache line data from processor circuitry 150 in cache entry circuitry 130 and corresponding transient data in entries of transient storage circuitry 140. Example organization of this circuitry is discussed in further detail below with reference to FIG. 2. Cache 110 may be a general purpose cache for a processor or may be a special-purpose cache that stores a specific type of data or data structure.

Processor circuitry 150, in the illustrated embodiment, reads and writes cache data and transient data using cache 110. Processor circuitry 150 may include portions of a central processing unit (CPU), e.g., that execute load and store instructions. Processor circuitry 150 may include portions of a graphics processing unit (GPU), e.g., which may perform various vertex, pixel, or compute operations using cache 110. Processor circuitry 150 may also be included in cache control circuitry, e.g., in situations where transient data may be indirectly derived by the cache itself rather than generated by a processor. In some embodiments, processor circuitry 150 is configured to access both a cache entry and its corresponding transient storage entry multiple times after the cache entry is allocated and before it is evicted.

Backing memory 160, in the illustrated embodiment, stores cache lines from cache 110 (e.g., based on evictions or in conjunction with writes in write-through implementations) and also provides read data to be stored in cache 110. As shown, data in transient storage circuitry 140 is not sent to backing memory 160 with its corresponding cache lines, which may reduce bandwidth to the backing memory and memory footprint in the backing memory. Backing memory 160 may be another cache (e.g., a higher-level cache in a cache hierarchy) or a memory and may be implemented using any of various appropriate memory technologies.

Figure 2:
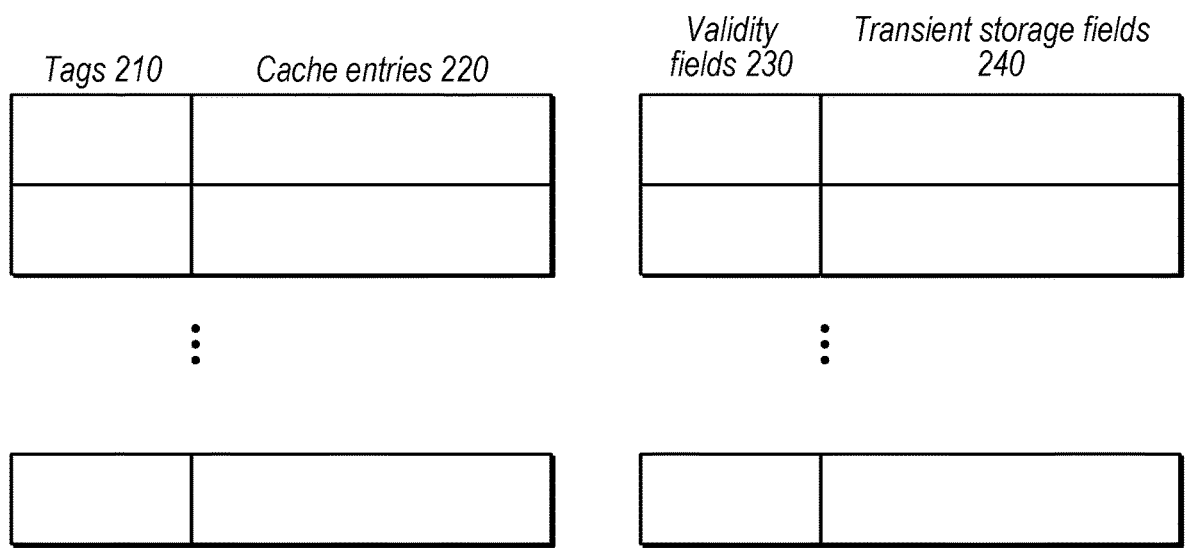
FIG. 2 is a diagram illustrating example cache entries, tags, and corresponding transient storage fields, according to some embodiments.

FIG. 2 is a diagram illustrating example organization of cache entries and corresponding transient storage fields, according to some embodiments. In the illustrated example, cache 110 includes tags 210, cache entries 220, validity fields 230, and transient storage fields 240.

Tags 210 may be portions of addresses used to detect whether requested data is already cached, as is well-understood to those of skill in the art. When a provided tag matches the tag of a cache line, the data may be accessed using the cache. Note that cache control circuitry 120 may generate or store additional metadata for each cache entry, such as least recently used (LRU) data that may be used to select an entry for replacement, e.g., when the cache is full. Other examples of such metadata include a dirty field that indicates whether a cache entry is modified relative to its backing memory location, valid information that indicates whether a cache entry currently holds valid data, etc.

Cache entries 220, in the illustrated embodiment, include circuitry configured to store cached data. Note that the cache may be implemented using any of various associativity techniques including direct mapped, fully associative, or set associative with various set sizes. In direct mapped and set associative implementations, addresses may be divided into tag, index, and offset portions as is well-understood both those of skill in the art. Similarly, the cache may be implemented using write-through techniques in which a write is not considered complete until it is written to both the cache and the backing memory and write-back techniques in which a write is considered complete when it has been written to the cache, regardless of whether it has also been written to the backing memory.

Transient storage fields 240, in the illustrated embodiment, are configured to store transient information for corresponding cache entries 220. In some embodiments, there is one transient storage field 240 for each cache entry 220. In other embodiments, there may be multiple transient storage fields for each cache entry 220 and there may be separate validity indications for each field. As discussed above, transient storage fields may be implemented by separate hardware than cache entries 220, e.g., as a separate RAM.

Validity fields 230, in the illustrated embodiment, indicate whether a given transient storage field is valid. In some embodiments, this may allow a transient storage field to be invalid even when its corresponding cache entry 220 holds valid data. This may occur, for example, when a cache line is evicted, then re-retrieved into the cache, in which case the corresponding transient data may be lost and remain invalid until it is regenerated. In some embodiments, the system is configured to automatically re-generate transient information in this situation, e.g., by generating transient information for incoming cache lines each time a cache entry is allocated.

Note that processors may specify and handle data as transient at various granularities. For example, in some implementations a processor may mark entire cache lines as transient or non-transient and accordingly back up (or not) those lines to a backing memory. The disclosed techniques with separate transient storage associated with cache lines, however, may provide improved bandwidth and power characteristics, particularly in scenarios where data being processed includes separate portions that are easily identifiable as transient and non-transient, e.g., when two sets of data are related but elements of one set can be lost while the other set needs to be backed up.

As one specific example of related transient and non-transient data, in some embodiments a device uses cache 110 as a tail pointer cache to store addresses of tails of linked lists. In these embodiments, when appending to a linked list, the tail location may be quickly determined if the tail pointer address for the list is cached. For example, a linked list, for each tile in a graphics processor that implements tile-based deferred rendering (TBDR), may indicate graphics geometry that intersects the tile. A pointer to a vertex data buffer may be one of the larger pieces of data in entries such a linked list.

In some embodiments, the transient data stored in transient storage circuitry 140 is a set of upper bits of the vertex data buffer pointer. In some embodiments, the system is configured to store a number of upper bits of the vertex data buffer pointer address that match a previous vertex data buffer pointer to the transient field (e.g., up to a maximum size of this field) and store remaining lower bits in the linked list itself (which may be stored or cached elsewhere in the system). This may act as a form of compression to reduce the amount of data stored the linked list, in various embodiments. Speaking generally, the disclosed techniques may be used to store data from previous data structure entries that may be used to compress data stored in other data structure entries, e.g., by implying duplicate data rather than actually duplicating it. In the specific example above, when a transient entry is lost, e.g., when a cache entry is evicted, all of the bits of the next vertex data buffer pointer may be written to the linked list (which may also occur when a vertex data buffer pointer does not match any bits with the prior pointer). Thus, loss of the transient data does not affect correct operation but may result in a larger number of bits in a linked list entry, relative to if the transient data had been written to a backing memory and available for subsequent use.

In other embodiments, similar techniques may be used with other types of data for a linked list (or any other appropriate data structure). For example, in embodiments in which cache 110 is a tail pointer cache for a linked list, the transient data may keep a running checksum of content in the linked list, which may be inserted into the list periodically or when transient data is invalidated. This may facilitate debug operations without affecting the memory footprint of the tail pointer structure. Similarly, the transient data may be used for performance statistics, debug information accessible on a scan dump, etc.

Figure 3:
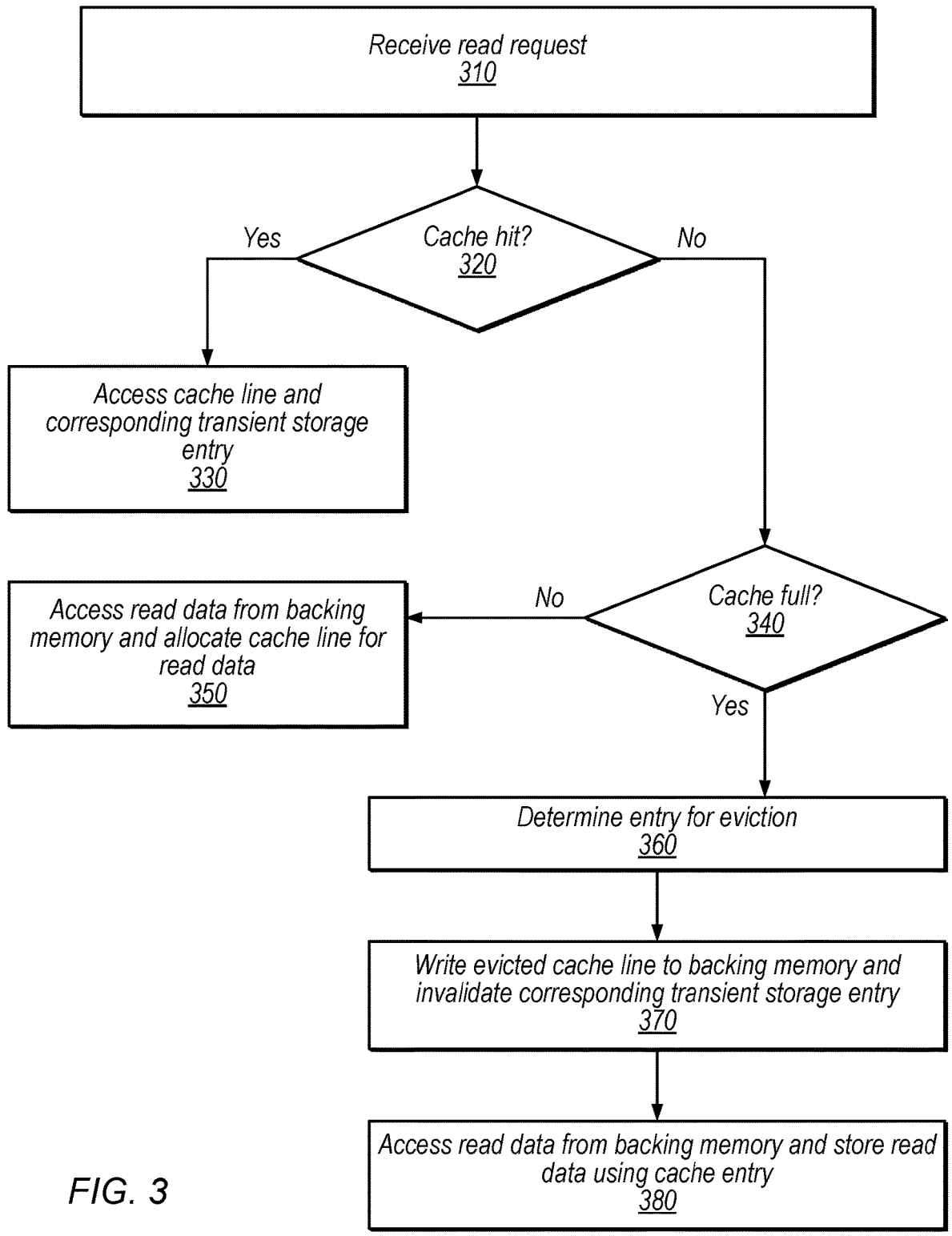
FIG. 3 is a flow diagram illustrating example techniques for processing read requests, according to some embodiments.

FIG. 3 is a flow diagram illustrating an example method for processing a read request, according to some embodiments. The method shown in FIG. 3 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 310, in the illustrated embodiment, cache control circuitry 120 receives a read request, e.g., to read data from a particular address. At 320, cache control circuitry 120 determines whether there is a cache hit for the request, e.g., using tag information.

If there is a cache hit at 320, flow proceeds to 330 where cache control circuitry 120 accesses the cache line and the corresponding transient storage entry. In some embodiments, the cache control circuitry 120 checks whether the transient storage entry is valid at this point. In other embodiments, a transient storage entry may always be valid if there is a corresponding cache hit.

If there is not a cache hit at 320, flow proceeds to 340 where cache control circuitry 120 determines whether the cache is full. If the cache is not full, flow proceeds to 350 where cache control circuitry 120 accesses the requested data from the backing memory and allocates a cache line for the read data. The system may also generate transient data for the read data at this point, otherwise, the transient field may remain invalid until transient data is generated.

If the cache is full at 340, flow proceeds to 360 where cache control circuitry 120 determines an entry for eviction. This determination may be based on an LRU policy, for example. At 370, the cache control circuitry 120 writes the evicted cache line to backing memory and invalidates the corresponding transient storage entry. At 380, the cache control circuitry retrieves the requested data from the backing memory and stores the read data using the cache entry that was evicted at 370.

Figure 4:
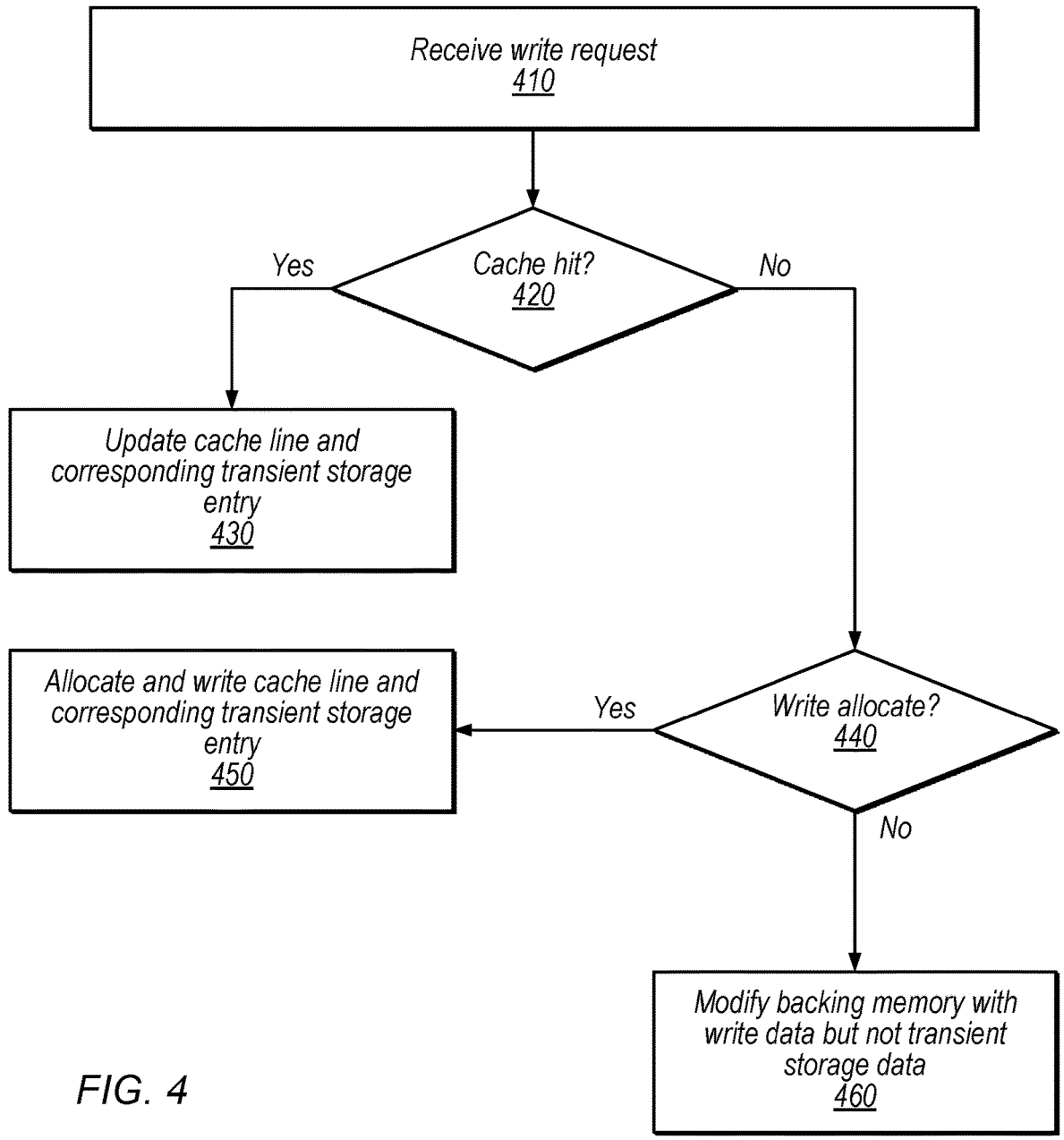
FIG. 4 is a flow diagram illustrating example techniques for processing write requests, according to some embodiments.

FIG. 4 is a flow diagram illustrating an example method for processing a read request, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, cache control circuitry 120 receives a write request, e.g., to write provided data to a particular address. At 420, cache control circuitry 120 determines whether there is a cache hit for the request.

If there is a cache hit at 420, flow proceeds to 430 where cache control circuitry 120 updates the cache line and corresponding transient storage entry with the write data. In some embodiments, cache control circuitry 120 may also write the cache line (but not the transient storage entry data) through to a backing memory.

If there is not a cache hit, flow proceeds to 440 where cache control circuitry 120 determines whether the request is a write allocate request. For example, in some embodiments write allocate requests use the cache while other requests bypass the requests and write directly to backing memory. If the request is not a write allocate request, flow proceeds to 460 and cache control circuitry 120 modifies the backing memory with the write data but does not write any corresponding transient storage data.

If the request is a write allocate, flow proceeds to 450 where cache control circuitry 120 allocates and writes a cache line and corresponding transient storage entry.

Example Method

FIG. 5 is a flow diagram illustrating an example method for operating a cache with respective transient storage entries for cache entries, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, cache control circuitry stores received first data in a data field of a cache entry and stores received transient data in a corresponding transient storage field, where the cache includes a set of multiple cache entries that each include a tag field and a data field and where transient storage circuitry includes a transient storage field for each of the multiple cache entries.

At 520, in the illustrated embodiment, cache control circuitry, in response to an eviction determination for the cache entry, writes the first data but not the transient data to a backing memory for the cache circuitry. Note that, prior to the eviction determination, the cache control circuitry may read or modify the cache entry and the corresponding transient storage field multiple times. In write through embodiments, such modifications to the cache entry (but not the corresponding transient storage field) may be written through to the backing memory. In write back embodiments, the backing memory may remain unmodified through multiple accesses and the cache entry may be marked as dirty when modified, for example.

In some embodiments, the transient storage circuitry includes respective validity fields for the transient storage fields and the cache control circuitry is further configured to invalidate the transient storage field corresponding to the evicted entry. In some embodiments, the cache circuitry further comprises one or more fields for each entry in the set of multiple cache entries, where the one or more fields are configured to store metadata determined by the cache control circuitry for the entry. For example, the metadata may include least-recently used information, a field indicating whether an entry is modified, etc.

In some embodiments, the first data is an address of a pointer for a data structure and the corresponding transient data is information about the data structure. For example, the first data may an address of a pointer for a linked list and the corresponding transient data may be a portion of information stored in a corresponding entry in the linked list. In some embodiments, the transient data stores a subset of information in an entry of the data structure that matches a prior entry in the data structure. For example, the portion of information may be a portion of a pointer to a vertex data buffer. In some embodiments, the transient data stores metadata generated based on information in the data structure (e.g., error detection information, performance information, etc.).

In some embodiments, the cache control circuitry is further configured to, in response to detecting a hit for a read to the cache circuitry, output data from the hit cache entry and corresponding transient storage field. In some embodiments, the cache control circuitry is further configured to, in response to a store operation that indicates no cache allocation, write store data but not transient data associated with the store data to a location in the backing memory. In some embodiments, the backing memory is another cache. In some embodiments, the apparatus includes multiple hierarchical caches, and ones of the multiple hierarchical caches have different numbers of cache entries and different numbers of entries in associated transient storage circuitry. For example, the first level cache may include a first number of entries with a first number of transient storage fields while a higher-level cache may include a greater number of entries and greater number of transient storage fields. In these embodiments, transient information may not be backed up past a certain level in a cache/memory hierarchy.

Example Device

Figure 6:
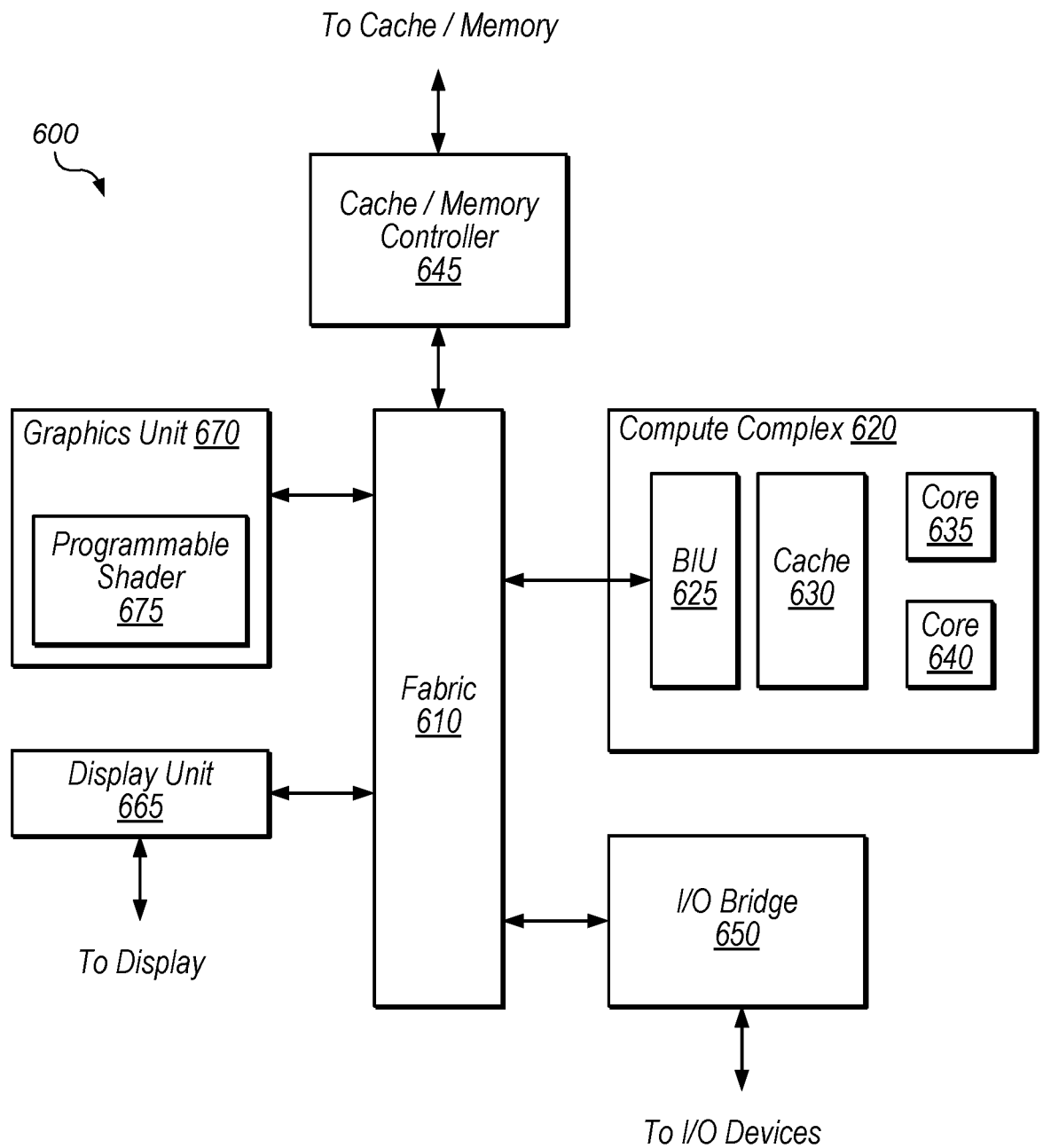
FIG. 6 is a block diagram illustrating an example computing device that includes one or more caches, according to some embodiments.

Referring now to FIG. 6, a block diagram illustrating an example embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 670, and display unit 665. In some embodiments, device 600 may include other components (not shown) in addition to and/or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 670 may be described as "coupled to" a memory through fabric 610 and cache/memory controller 645. In contrast, in the illustrated embodiment of FIG. 6, graphics unit 670 is "directly coupled" to fabric 610 because there are no intervening elements.

Graphics unit 670 may include one or more processors and/or one or more graphics processing units (GPU's). Graphics unit 670 may receive graphics-oriented instructions, such as OPENGL®, Metal, or DIRECT3D® instructions, for example. Graphics unit 670 may execute specialized GPU instructions or perform other operations based on the received graphics-oriented instructions. Graphics unit 670 may generally be configured to process large blocks of data in parallel and may build images in a frame buffer for output to a display. Graphics unit 670 may include transform, lighting, triangle, and/or rendering engines in one or more graphics processing pipelines. Graphics unit 670 may output pixel information for display images. Programmable shader 675, in various embodiments, may include highly parallel execution cores configured to execute graphics programs, which may include pixel tasks, vertex tasks, and compute tasks (which may or may not be graphics-related).

In some embodiments, cache 110 is included in graphics unit 670. Cache 110 may also be implemented within a CPU core or shared among multiple CPU cores. The diagram of FIG. 6 shows multiple potential locations for the disclosed cache 110, but is included for purposes of illustration and not intended to limit the location of caches that utilize the disclosed techniques.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 7:
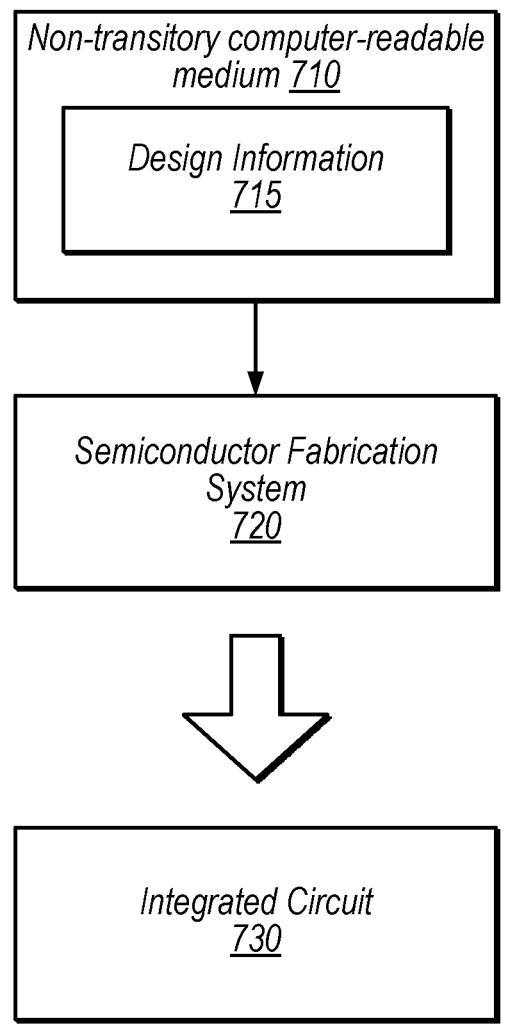
FIG. 7 is a block diagram illustrating an example computer-readable medium that stores circuit design information, according to some embodiments.

FIG. 7 is a block diagram illustrating an example non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable storage medium 710, may comprise any of various appropriate types of memory devices or storage devices. Non-transitory computer-readable storage medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 710 may include other types of non-transitory memory as well or combinations thereof. Non-transitory computer-readable storage medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730. In some embodiments, the design information is specified in whole or in part in the form of a netlist that specifies cell library elements and their connectivity. Design information 715, taken alone, may or may not include sufficient information for fabrication of a corresponding integrated circuit. For example, design information 715 may specify the circuit elements to be fabricated but not their physical layout. In this case, design information 715 may need to be combined with layout information to actually fabricate the specified circuitry.

Integrated circuit 730 may, in various embodiments, include one or more custom macrocells, such as memories, analog or mixed-signal circuits, and the like. In such cases, design information 715 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIG. 1, 2, or 6. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
cache circuitry that includes a set of multiple cache entries configured to store cache lines, wherein the cache entries includes respective tag fields and data fields;
transient storage circuitry that implements respective transient storage fields for ones of the cache lines, wherein the transient storage circuitry is dedicated to store data that is not to be written to a backing memory;
cache control circuitry configured to:
store received first data in the data field of a cache entry and store received transient data in a corresponding transient storage field of the transient storage circuitry; and
in response to an eviction determination for the cache entry, write the first data from the cache circuitry but not data from the corresponding transient storage field of the transient storage circuitry to a backing memory for the cache circuitry.

2. The apparatus of claim 1, wherein the transient storage circuitry includes respective validity fields for the transient storage fields and wherein the cache control circuitry is further configured to invalidate the transient storage field corresponding to the evicted entry.

3. The apparatus of claim 1, wherein the cache circuitry further comprises one or more fields for each entry in the set of multiple cache entries, wherein the one or more fields are configured to store metadata determined by the cache control circuitry for the entry.

4. The apparatus of claim 1, further comprising:
processor circuitry configured to determine the first data and generate the transient data.

5. The apparatus of claim 1, wherein the first data is an address of a pointer for a data structure and wherein the corresponding transient data is information about the data structure.

6. The apparatus of claim 5, wherein the transient data stores a subset of information in an entry of the data structure that matches a prior entry in the data structure.

7. The apparatus of claim 5, wherein the transient data stores metadata generated based on information in the data structure.

8. The apparatus of claim 1, wherein the cache control circuitry is further configured to, in response to detecting a hit for a read to the cache circuitry, output data from the hit cache entry and corresponding transient storage field.

9. The apparatus of claim 1, wherein the cache control circuitry is further configured to, in response to a store operation that indicates no cache allocation, write store data but not transient data associated with the store data to a location in the backing memory.

10. The apparatus of claim 1, wherein the backing memory is another cache.

11. The apparatus of claim 1, wherein the apparatus includes multiple hierarchical caches, wherein ones of the multiple hierarchical caches have different numbers of cache entries and different numbers of entries in associated transient storage circuitry.

12. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:

cache circuitry that includes a set of multiple cache entries configured to store cache lines, wherein the cache entries includes respective tag fields and data fields;
transient storage circuitry that implements respective transient storage fields for ones of the cache lines, wherein the transient storage circuitry is dedicated to store data that is not to be written to a backing memory;
cache control circuitry configured to:
store received first data in the data field of a cache entry and store received transient data in a corresponding transient storage field of the transient storage circuitry; and
in response to an eviction determination for the cache entry, write the first data from the cache circuitry but not data from the corresponding transient storage field of the transient storage circuitry to a backing memory for the cache circuitry.

13. The non-transitory computer readable storage medium of claim 12, wherein the transient storage circuitry includes respective validity fields for the transient storage fields and wherein the cache control circuitry is further configured to invalidate the transient storage field corresponding to the evicted entry.

14. The non-transitory computer readable storage medium of claim 12, wherein the cache circuitry further comprises one or more fields for each entry in the set of multiple cache entries, wherein the one or more fields are configured to store metadata determined by the cache control circuitry for the entry.

15. The non-transitory computer readable storage medium of claim 12, wherein the first data is an address of a pointer for a linked list and wherein the corresponding transient data is a portion of information stored in a corresponding entry in the linked list.

16. The non-transitory computer readable storage medium of claim 12, wherein the transient data is error detection data generated for the first data.

17. A method, comprising:
storing, by cache control circuitry, received first data in a data field of a cache entry and store received transient data in a corresponding transient storage field of transient storage circuitry, wherein the cache includes cache circuitry that includes a set of multiple cache entries that include respective tag fields and a data fields and wherein the transient storage circuitry implements transient storage fields for one of the cache lines and is dedicated to store data that is not to be written to a backing memory; and
in response to an eviction determination for the cache entry, the cache control circuitry writing the first data from the cache circuitry, but not the transient data from the corresponding transient storage field of the transient storage circuitry, to a backing memory for the cache circuitry.

18. An apparatus, comprising:
cache circuitry that includes a set of multiple cache entries, wherein the cache entries includes respective tag fields and data fields, wherein the cache circuitry implements transient storage fields for ones of the cache lines; and
cache control circuitry configured to:
store received first data in the data field of a cache entry and store received transient data in a corresponding transient storage field, wherein the first data includes an address of a pointer for a data structure and wherein the corresponding transient data includes information about the data structure; and in response to an eviction determination for the cache entry, write the first data from the cache circuitry but not the transient data to a backing memory for the cache circuitry.

19. The apparatus of claim 18, wherein the transient data stores a subset of information in an entry of the data structure that matches a prior entry in the data structure.

20. The apparatus of claim 19, wherein the subset of information is a portion of a pointer to a vertex data buffer.

21. The apparatus of claim 18, wherein the transient data stores metadata generated based on information in the data structure.

\* \* \* \* \*